Oct. 8, 1957 W. SMITH ET AL 2,808,671

WEATHER INFORMATION DISPLAY DEVICE

Filed Dec. 19, 1955 5 Sheets-Sheet 1

Inventors;
Wilder Smith,
Edward Sable,
by Arthur D. Thomson
Attys.

Oct. 8, 1957 W. SMITH ET AL 2,808,671

WEATHER INFORMATION DISPLAY DEVICE

Filed Dec. 19, 1955 5 Sheets-Sheet 2

Inventors:
Wilder Smith,
Edward Sable,
by [signature]
Att'ys.

WEATHER INFORMATION DISPLAY DEVICE

Filed Dec. 19, 1955 5 Sheets-Sheet 3

Inventors;
Wilder Smith,
Edward Sable,
by Albert D. Thomson
Att'ys.

Inventors;
Wilder Smith,
Edward Sable,
by Arthur D. Thomson
Attys.

Inventors;
Wilder Smith,
Edward Sable,
by Arthur D. Thomson
Att'ys

United States Patent Office 2,808,671
Patented Oct. 8, 1957

2,808,671

WEATHER INFORMATION DISPLAY DEVICE

Wilder Smith, Gloucester, and Edward Sable, Mattapan, Mass.

Application December 19, 1955, Serial No. 553,928
3 Claims. (Cl. 40—133)

The subject of this invention is a device for visual display of information as to current weather conditions over a particular area.

The device here disclosed is useful in public buildings, such as rail and air terminals, where the travelling public may be interested in obtaining information as to weather conditions and forecasts. The device is also suitable for general use as an advertising attraction. By means of this device, weather information may be displayed in highly visible and interesting form. The map used to display the information is self-explanatory so as to be understandable to an observer having no special knowledge of meteorological symbols. Provision is also made for changing the weather indications in accordance with current conditions without disturbing the permanent outlines and indications of the map.

In the drawings illustrating the invention:

Figure 1:
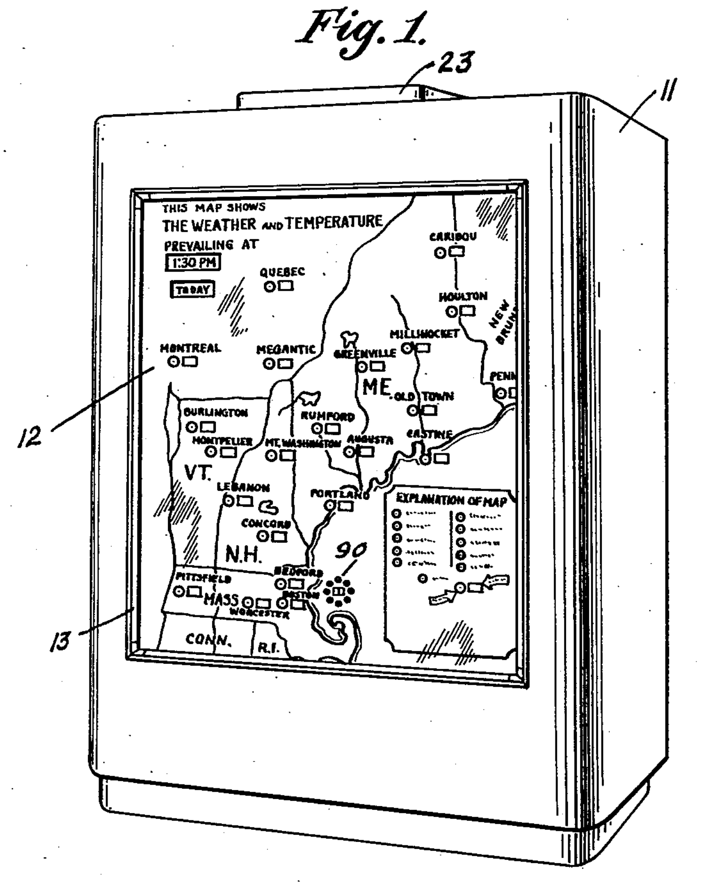
Fig. 1 is a perspective view of a weather information display booth constructed according to the invention.
Figure 2:
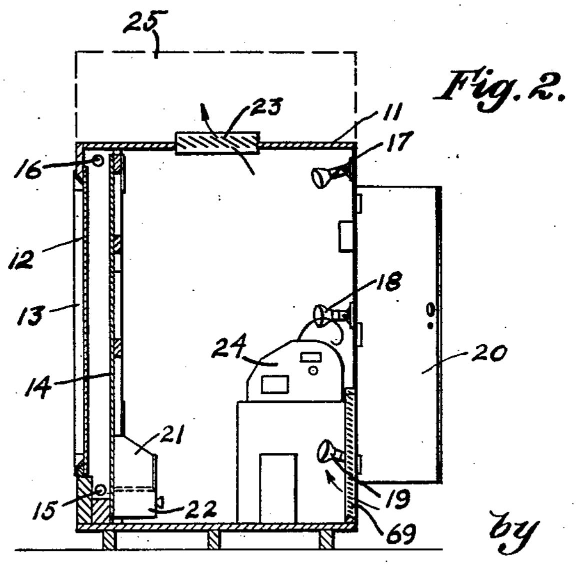
Fig. 2 is a vertical cross-section through the booth.

The assembled display booth, as illustrated in Figs. 1 and 2, consists in general of a cabinet 11 having a glass display window 12 mounted in a frame 13, a map panel 14 mounted behind the window and illuminated from the front by tubular show case lamps 15 and 16. Along the bottom of the map panel are bins 21 and drawers 22 for storing the indicator and numeral blocks used on the map. In the rear of the cabinet are lamps 17, 18 and 19, preferably mounted on adjustable brackets. A rear access door 20 is provided, so that an operator may enter to rearrange the indicators on the map panel. A teletype recorder 24 or other suitable means for receiving and recording weather information is preferably housed in the cabinet for convenience. A ventilator grill 23 is mounted in the top of the cabinet and a second ventilator grill 69 in the rear. Advertising billboards may be displayed on top of the cabinet in the area indicated by the dotted outline 25.

Figure 3:
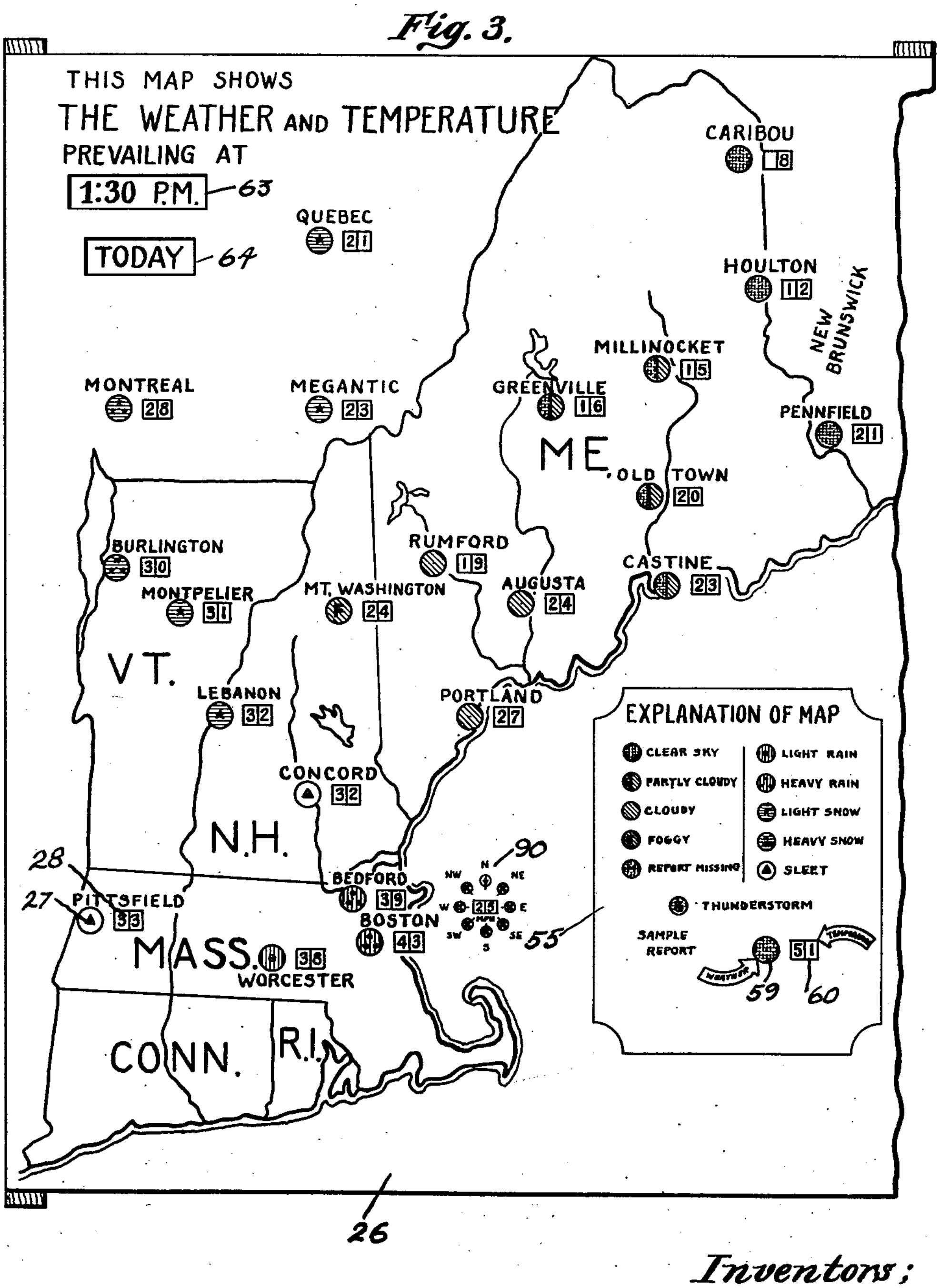
Fig. 3 is a detail of the map displayed on the front panel of the booth.
Figure 4:
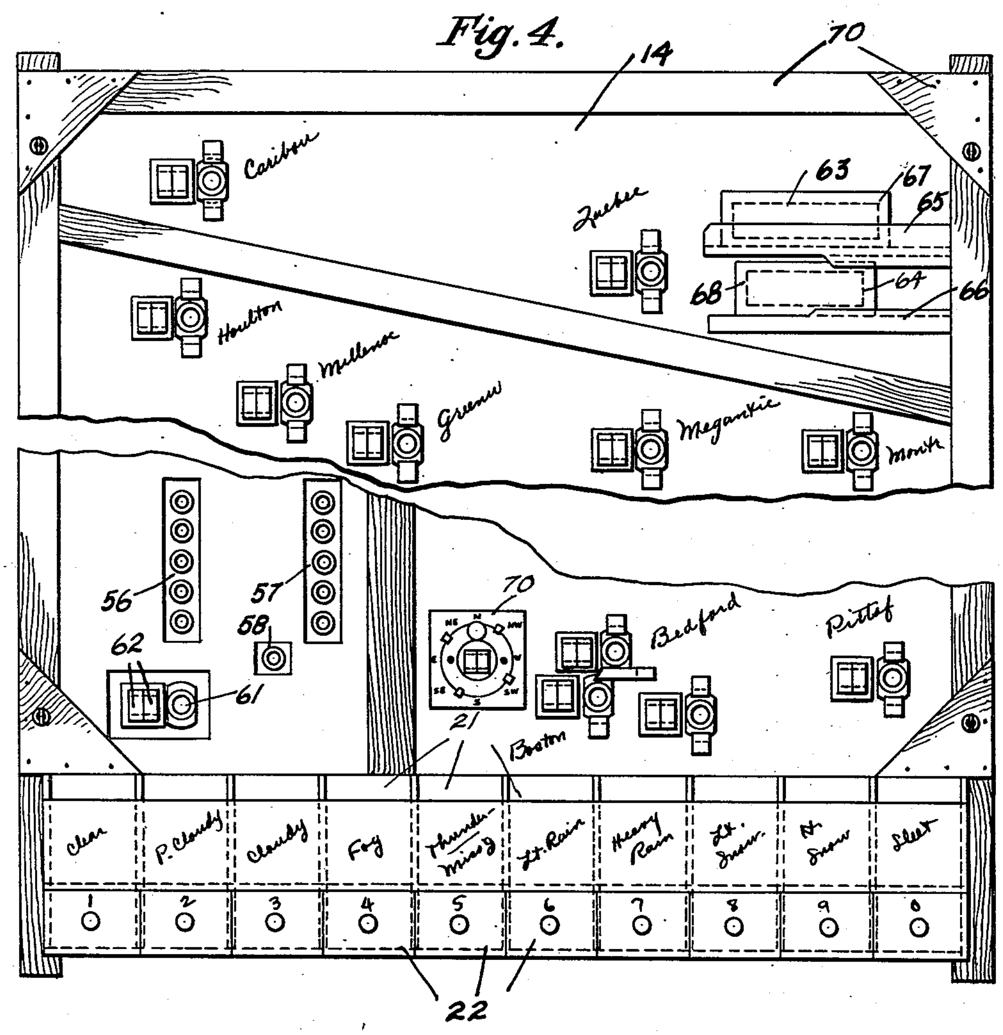
Fig. 4 is a rear view of the map display panel.
Figure 8:
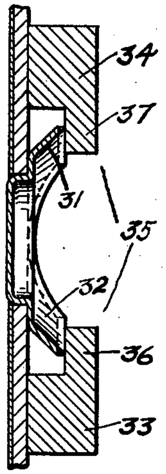
Fig. 8 is a cross-section along line 8—8 of Fig. 7.

The map panel 14, illustrated in more detail in Figs. 3 and 4, is made of plywood or similar material and mounted on a rectangular wooden frame 70. A map 26 of any desired geographical area, here illustrated, by way of example, as a map of the New England States, is mounted or painted on the front of the panel. At the location of each of the principal cities or landmarks is cut a round opening and a rectangular opening, for example openings 27 and 28. An indicator button of the type illustrated in Figs. 5 and 8 is mounted in the round opening, and two numeral blocks of the type illustrated in Fig. 6 are mounted in the rectangular opening.

Figure 5:
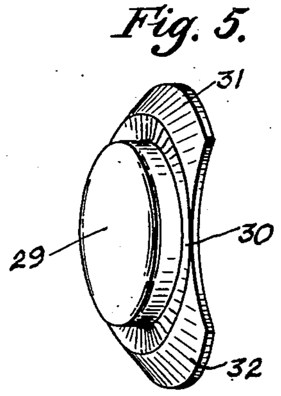
Fig. 5 is a perspective view of one of the interchangeable indicator buttons.
Figure 7:
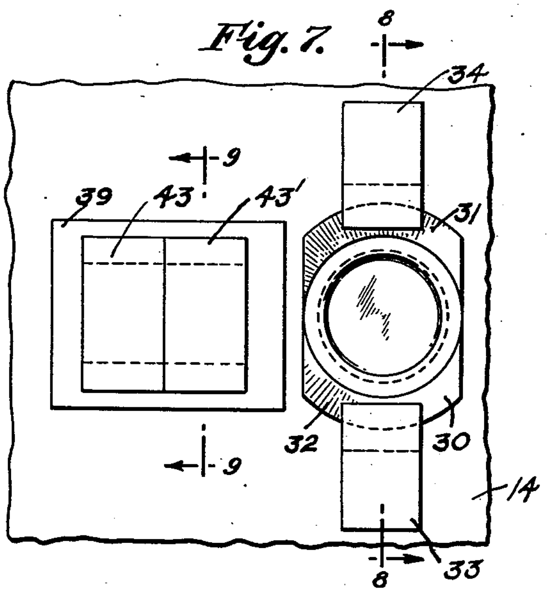
Fig. 7 is a detail of one of the indicator mountings.

The indicator button shown in Fig. 5 is made of a material such as transparent or translucent plastic, formed in the shape of round boss 29 surrounded by a bevelled mounting flange 30 which is cut away on either side as shown in Fig. 7. The boss is of suitable diameter so as to fit firmly in opening 27. Mounted on the back of panel 14 near each of the round openings, is a pair of angular clips, for example clips 33 and 34, illustrated in Figs. 7 and 8. The button is inserted in the panel from the back by aligning the narrow sides of the flange 30 so as to pass through opening 35, and then locked in place by rotating the wider top and bottom parts 31 and 32 of the flange into the recesses formed by legs 36 and 37 of clips 33 and 34.

Figure 6:
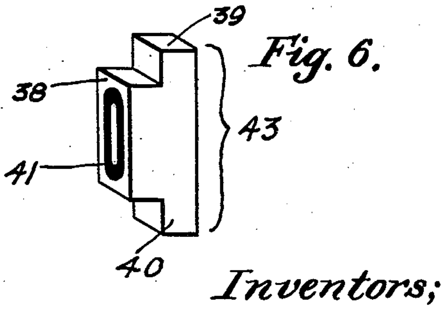
Fig. 6 is a detail, in perspective, of one of the numeral blocks used to indicate temperature conditions.
Figure 9:
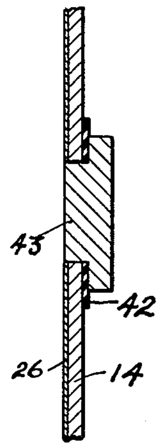
Fig. 9 is a cross-section along line 9—9 of Fig. 7.

The numeral blocks, an example of which is shown in Fig. 6, are made of translucent plastic or similar material. The block is T-shaped in cross-section, the stem of the T terminating in a rectangular raised face 38 and the legs of the T forming lugs 39 and 40. Face 38 is of a height suitable to fit into openings 28 and bears an opaque numeral 41, which may be painted, or may be cut from sheet material and pasted on. The mounting of the blocks is illustrated in Figs. 7 and 9. A rubber frame 42 is attached to the back of panel 14 around the rectangular openings corresponding to opening 28. These openings are of a size to accommodate the stem portions of two of the numeral blocks, side by side, for example blocks 43 and 43', as shown in Fig. 7. The faces of the blocks, bearing appropriate numerals, are flush with the front of the panel, and the lugs of the blocks rest against frame 42.

Figure 10:
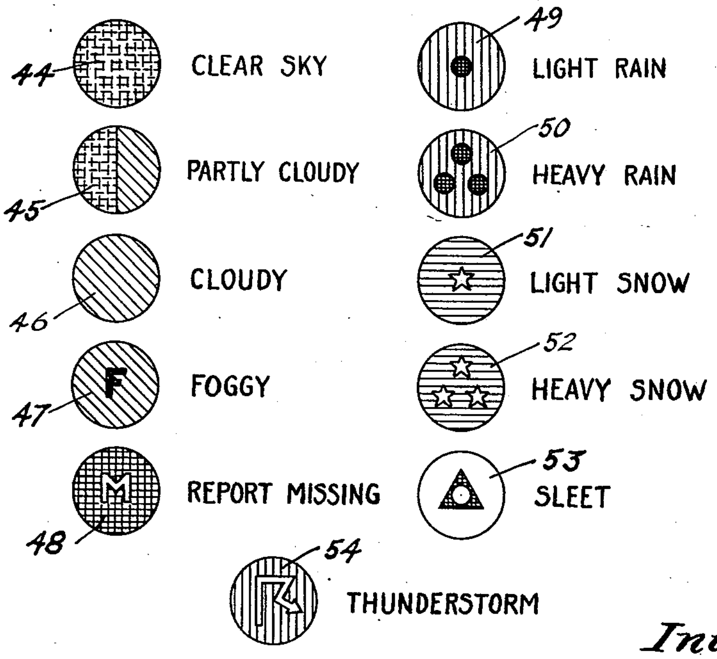
Fig. 10 is a key diagram illustrating the meaning of the various indicator symbols.
Figure 11:
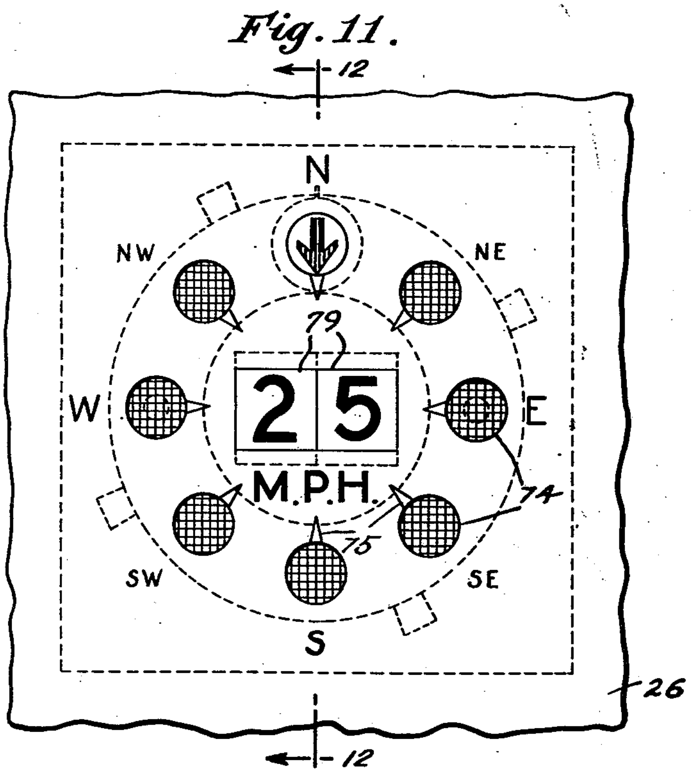
Fig. 11 is an enlarged front view of a wind direction and velocity indicator used on the device.

The bosses of the indicator buttons are made in various colors and may have symbols cut from opaque sheet material, attached to their faces. The colors and symbols correspond to the various weather conditions which are to be indicated on the front of the map panel. A typical color code for this purpose is illustrated in Fig. 10. Circle 44 is yellow, indicating clear sky, circle 45 half yellow and half green indicates a partly cloudy sky. An all green button 46 indicates a cloudy sky. A green button bearing a block letter "F," and shown in circle 47, indicates fog, an opaque black button bearing a white letter "M," as shown in circle 48 is used when no weather report has been received from a particular locality. A red button with a black dot in the middle, as illustrated by circle 49, indicates light rain, a red button with three black dots, arranged as shown in circle 50, indicates heavy rain, a blue button with a white star, as illustrated by circle 51, indicates light snow, and a blue button with three white stars, arranged as shown in circle 52, indicates heavy snow. A translucent white button bearing a black triangle with a white dot in the center, as shown in circle 53, is used to indicate sleet, and a red button bearing a white jagged arrow symbol, as illustrated in circle 54, is used to indicate a thunder storm.

As shown in Fig. 3, a chart 55 explaining the color symbols is displayed on the front of the map panel, in any location which does not intefere with geographical designations. The chart is printed or painted with various colored circles alongside of which are written out the appropriate weather designations, such as "Clear Sky," "Foggy," etc. In place of painted circles, the chart may have holes in which are permanently mounted small sample buttons similar in appearance to the removable indicator buttons, each sample being appropriately colored and marked according to the written weather indication which it symbolizes. A number of such samples are here illustrated in Fig. 4 as mounted on strips 56, 57, 58 on the back of the map panel. The chart may also have a sample round opening 59 and rectangular opening 60 with the explanatory words "Weather" and "Temperature" written alongside. An indicator button and a pair of numeral blocks of the types used for the actual weather indications are mounted in these openings.

On an upper corner of the map panel are two elongated openings 63 and 64 (Figs. 3 and 4). An angle bracket 65 is mounted on the back of the panel so as to support a removable placard 67 for display through opening 63, and a second angle bracket 66 is mounted for similarly supporting a placard 68 for display through opening 64. Placard 67 displays a time indication, and placard 68 may be printed with the word "Today" or the day of the week. At the back of the panel, across the bottom, is a row of storage bins 21 and drawers 22, all appropriately labelled, for storing extra indicator buttons and numeral blocks. A number of buttons and blocks of each symbol and numeral designation are supplied with the panel. Blocks bearing minus signs are also supplied for indicating subzero temperatures.

When the device is in use the panel is illuminated from the front by lamps 15 and 16, and light from lamps 17, 18 and 19 shines through the transparent or translucent indicator buttons and blocks mounted on the panel, making the weather indications clearly visible. An operator enters through the access door from time to time and arranges the buttons and numeral blocks in accordance with the latest information received as to weather conditions and temperatures as the localities shown on the map, such information as may be received, for example, over the teletype apparatus 24. It will be noted that the openings for the removable indicators are appropriately labelled on the back of the panel to facilitate manipulation by the operator.

Figure 12:
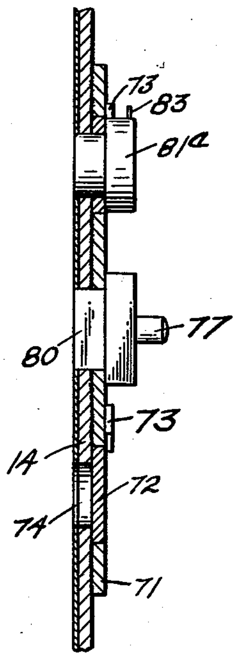
Fig. 12 is a cross-section taken along line 12—12 of Fig. 11.
Figure 13:
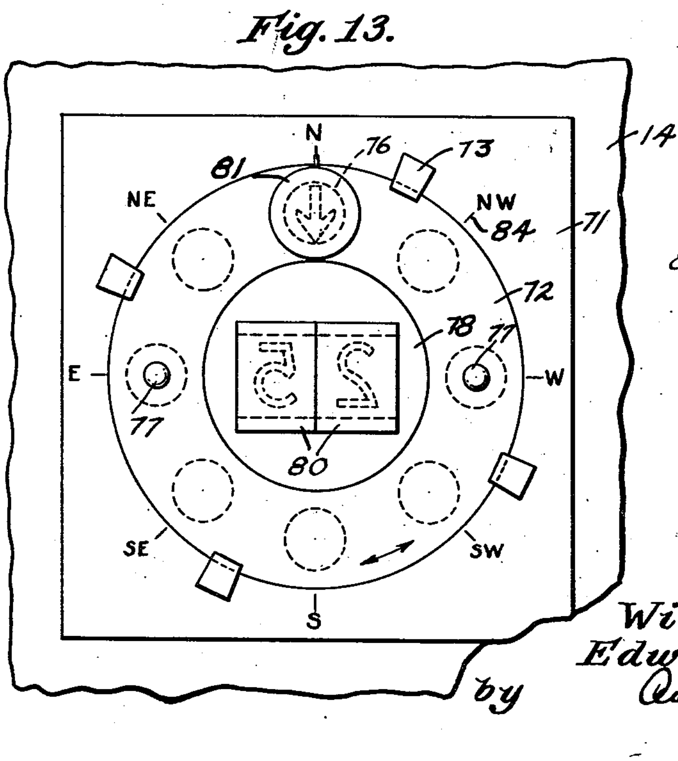
Fig. 13 is a rear view of the wind indicator of Fig. 11.
Figure 14:
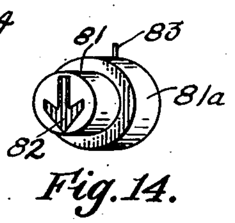
Fig. 14 is a perspective view of the wind indicator button.

In addition to the indicators of weather and temperature conditions, a wind indicator, generally designated in Figs. 1, 3 and 4 by the numeral 90, may be mounted on the panel near one of the principal cities to indicate the direction and velocity of the wind in that location. As illustrated in detail in Figs. 12 and 13, a frame 71 is attached, by gluing or any other suitable means, to the back of panel 14 at the desired location. Within this frame is a rotatable masking ring 72 which is retained by tabs 73 attached to the frame. A number of circular openings 74 are cut in the panel in a circular arrangement corresponding to points of the compass. Pointers 75 may be painted or printed on the face of the map alongside these openings.

Ring 72 has a single round opening 76 which may be brought into register with any of the openings 74. A pair of knobs 77 are provided on the back of ring 72 so that the ring can be readily turned to the desired position.

A disk 78 is secured to panel 14 inside ring 72, and a rectangular opening 79 is cut through this disk and through the panel, and blocks 80, similar to the temperature indicator blocks 43, 43', are inserted in this opening to indicate wind velocity.

Ring 72 is opaque so as to mask all the openings 74 except the one with which opening 76 is in register. A wind direction indicator button 81 is placed in the registered openings. This button is translucent and generally cylindrical, and has a rear flange **81*a*. An opaque arrow 82 is applied to the front of button 81, and flange 81*a* carries a marker 83 which may be aligned with marks 84 on the back of frame 71** to ensure that the arrow points in the proper direction to indicate wind directions.

If desired, the map may be used to show weather forecasts, rather than current weather conditions, by inserting a time placard indicating a time any desired number of hours in advance and arranging the weather indications according to forecasts received on the teletype.

It is understood that this disclosure is illustrative, and that the invention embraces any modifications within the scope of the appended claims.

What is claimed is:

1. A display panel having depicted on its front a map of a geographical area bearing designations of important landmarks, a circular opening near each of said designations, a pair of brackets mounted on the rear of said panel near each of said openings, said brackets having free legs extending toward the opening near which they are mounted, and removable indicators symbolizing weather conditions mounted in said openings, each of said indicators comprising a button of diameter suitable to enter said openings attached to a pair of lugs proportioned and arranged to slide between said legs and said panel.

2. A display booth comprising: a housing; an opaque display panel having front and rear faces and having depicted on its front face a map of a geographical area bearing designations of important landmarks; means for mounting said panel in said housing; openings in said panel near said designations; light-transmitting indicators symbolizing weather conditions mounted in said openings and removable from said panel from the rear thereof, and illuminating means mounted in said housing behind the rear face of said panel and providing general illumination of all said indicators while leaving the indicators accessible for removal.

3. In a display panel having depicted on its front a map of a geographical area bearing designations of important landmarks, openings near said designations, and removable indicators mounted in said openings to symbolize weather conditions, a wind direction indicator comprising a frame attached to said panel, an opaque ring rotatably mounted on said frame, a number of holes in said panel disposed to be masked by said panel, said ring having a hole arranged to register with any one of said panel holes, and a translucent button adapted for insertion into the hole in said ring and a registered hole in said panel.

References Cited in the file of this patent

UNITED STATES PATENTS

| | | |
|---|---|---|
| 1,601,844 | Blackmore | Oct. 5, 1926 |
| 1,884,500 | Anderson | Oct. 25, 1932 |
| 1,941,777 | Amos | Jan. 2, 1934 |
| 2,567,189 | Davis | Sept. 11, 1951 |